W. H. WARD.
VEHICLE AXLE.
No. 179,747. Patented July 11, 1876.
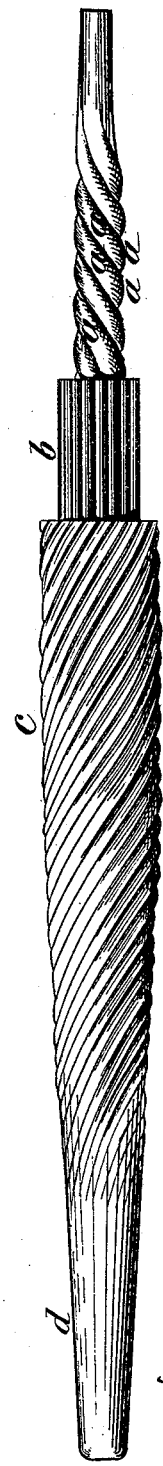
Witnesses:
Inventor:
William Henry Ward,
By Johnson and Johnson,
his Attorneys.

UNITED STATES PATENT OFFICE.

WILLIAM H. WARD, OF ALEXANDRIA, VIRGINIA.

IMPROVEMENT IN VEHICLE-AXLES.

Specification forming part of Letters Patent No. 179,747, dated July 11, 1876; application filed December 16, 1875.

*To all whom it may concern:*

Be it known that I, WILLIAM HENRY WARD, of Alexandria, in the county of Alexandria and State of Virginia, have invented a new and useful Improvement in Twist Laminated Axles, of which the following is a specification:

My improved axle is constructed to obtain the greatest possible tensile strength and toughness, and thereby diminish its liability to break in two. For this purpose a core of twisted rods is combined with an outer layer of spiral rods and an intermediate layer of parallel rods, so that when welded together the elongation of the twisted core or center rods and the outer spiral layer will be uniform with each other, and the intermediate parallel layers, and thereby avoid all longitudinal strain during the process of welding.

I have found the best results produced from a twisted core or center rod in its combination with the parallel and outer spiral layers, because, in welding an axle in which the core is straight, the outer spiral layers would be embedded into the straight core and elongate it unevenly with the outer twisted layers, and thereby produce an almost breaking strain, which greatly weakens the core of the axle. Where, in axles, the outer layer or layers form spirals, it is necessary, to obtain the greatest tensile strength, that the core-rod must also be of two or more layers twisted together in a direction opposite to the outer spiral layer, so that the strain upon both shall be equal, and with that upon the parallel rods, giving the axle, when consolidated into a homogeneous bar, great strength and toughness.

The accompanying drawing represents an axle-blank, in which the core or center rod is formed of two or more rods, *a a*, twisted together compactly, and over this twist-core a layer of parallel rods, *b*, is arranged, while an outer layer of rods, *c*, is wound spirally over the blank in a direction opposite to the twist of the core-rods, so as to bring the twists right and left. These rods are of suitable size and length, so that when the blank is heated and consolidated the axle will be of the right length and diameter. The rods are cylindrical, so that they need no fitting, but can be easily and quickly formed into a compact blank.

The twisted rods *a a* of the core and the oppositely outer twisted rods *c*, will, under the welding process, have a uniform elongation, and the intermediate layer of parallel rods will be equally extended and embedded into the center and outer twists, so that the grain or fiber of the several layers of rods will be consolidated and elongated without injurious strain in the length of the core, as the rods forming such core being wound spirally with each, gives it capacity for the needed elongation, and hence avoids that undue strain which would be produced in a straight core. This twist-core, therefore, in the combination I have described, forms the gist of my invention, and is a very advantageous feature in the construction of a twist-axle, in giving it greater stiffness and toughness throughout its entire length.

In the axle-blank shown, the outer spirally-wound rods and the intermediate parallel rods are broken away to expose the twisted rods which form the core. In the drawing one end *d* of the axle-blank is shown as welded, indicating the appearance of the finished axle.

I claim—

A twist-axle formed by the twisted core-rods *a*, the parallel rods *b*, and the outer layer of rods *c*, wound upon the parallel rods in a direction opposite to that of the core-rods, as shown, and for the purpose described.

In testimony that I claim the foregoing I have affixed my signature in the presence of two witnesses.

W. H. WARD.

Witnesses:
J. A. RUTHERFORD,
J. W. HAMILTON JOHNSON.